United States Patent [19]
Pearlstine et al.

[11] Patent Number: 6,087,416
[45] Date of Patent: *Jul. 11, 2000

[54] AQUEOUS PIGMENTED INK JET INKS FOR PRINTING ON VINYLS

[75] Inventors: Kathryn Amy Pearlstine, Wilmington, Del.; Loretta Ann Grezzo Page, San Diego, Calif.; Robert Paul Held, Newark, Del.

[73] Assignee: E.I. du Pont de Nemours and Company, Wilmington, Del.

[*] Notice: This patent is subject to a terminal disclaimer.

[21] Appl. No.: 09/120,922

[22] Filed: Jul. 22, 1998

[51] Int. Cl.$^7$ .......................... C09D 11/02; C09D 11/10; C09D 133/08; C09D 133/10

[52] U.S. Cl. .................. 523/160; 106/31.6; 106/31.85; 106/31.89

[58] Field of Search .................... 523/160, 161; 106/31.13, 31.27, 31.28, 31.57, 31.59, 31.6, 31.85, 31.89

[56] References Cited

U.S. PATENT DOCUMENTS

| | | | |
|---|---|---|---|
| 2,834,748 | 5/1958 | Balley et al. | 260/42 |
| 3,305,504 | 2/1967 | Huntington | 260/29.2 |
| 4,176,361 | 11/1979 | Kawada et al. | 346/1.1 |
| 4,399,443 | 8/1983 | Yasufuku et al. | 346/1.1 |
| 4,597,794 | 7/1986 | Ohta et al. | 106/20 |
| 4,756,757 | 7/1988 | Haruta et al. | 106/20 |
| 4,762,865 | 8/1988 | Gold | 523/411 |
| 4,762,875 | 8/1988 | Gold | 524/248 |
| 4,792,357 | 12/1988 | Bier | 106/83 |
| 4,820,549 | 4/1989 | Ozaki et al. | 427/98 |
| 4,935,461 | 6/1990 | Nakamura | 524/306 |
| 4,986,850 | 1/1991 | Iwata et al. | 106/25 |
| 5,085,698 | 2/1992 | Ma et al. | 106/20 |
| 5,169,437 | 12/1992 | You | 106/20 D |
| 5,169,438 | 12/1992 | Matrick | 106/22 R |
| 5,172,133 | 12/1992 | Suga et al. | 346/1.1 |
| 5,190,582 | 3/1993 | Shinozuka et al. | 106/20 D |
| 5,211,747 | 5/1993 | Breton et al. | 106/20 R |
| 5,221,334 | 6/1993 | Ma et al. | 106/20 D |
| 5,328,504 | 7/1994 | Ohnishi | 106/20 D |
| 5,344,872 | 9/1994 | Debord et al. | 524/513 |
| 5,387,655 | 2/1995 | Aslin | 525/511 |
| 5,441,561 | 8/1995 | Chujo et al. | 106/20 C |
| 5,443,628 | 8/1995 | Loria et al. | 106/20 C |
| 5,447,562 | 9/1995 | Maeda et al. | 106/20 R |
| 5,462,592 | 10/1995 | Murakami et al. | 106/22 R |
| 5,470,904 | 11/1995 | Loftin et al. | 524/462 |
| 5,512,089 | 4/1996 | Thakkar | 106/20 R |
| 5,512,623 | 4/1996 | Loftin et al. | 524/462 |
| 5,538,548 | 7/1996 | Yamazaki | 106/20 C |
| 5,538,549 | 7/1996 | Kato et al. | 106/20 C |
| 5,542,969 | 8/1996 | Hirasa et al. | 106/20 C |
| 5,640,187 | 6/1997 | Kasiwazaki et al. | 347/101 |
| 5,695,899 | 12/1997 | Kamada et al. | 430/106 |
| 5,716,435 | 2/1998 | Aida et al. | 106/31.85 |
| 5,725,647 | 3/1998 | Carlson et al. | 106/31.86 |
| 5,772,746 | 6/1998 | Sawada et al. | 106/31.86 |
| 5,814,685 | 9/1998 | Satake et al. | 523/201 |
| 5,852,075 | 12/1998 | Held | 523/161 |
| 5,883,157 | 3/1999 | Yamashita et al. | 523/161 |
| 5,900,899 | 5/1999 | Ichizawa et al. | 347/100 |

FOREIGN PATENT DOCUMENTS

| | | |
|---|---|---|
| 0 586 101 A1 | of 0000 | European Pat. Off. |
| 0 606 490 A1 | of 0000 | European Pat. Off. |
| 0571190 | 5/1993 | European Pat. Off. |
| 0732344 | 3/1996 | European Pat. Off. |
| 0826751 | 3/1998 | European Pat. Off. |
| 0851014 | 7/1998 | European Pat. Off. |
| 930271830 | 5/1995 | Japan. |

*Primary Examiner*—Vasu Jagannathan
*Assistant Examiner*—Callie E. Shosho
*Attorney, Agent, or Firm*—Joseph A. Tessari

[57] ABSTRACT

An ink jet ink composition and process for printing on vinyl substrates in which the ink comprises an aqueous vehicle containing at least water and a water-miscible glycol or glycol ether, wherein water constitutes no more than 80% by weight based on the total weight of the vehicle; an insoluble colorant (preferably a pigment); a polymeric dispersant; a silicon or fluorinated surfactant; and, optionally but preferably, a graft copolymer binder having a hydrophobic backbone and non-ionic, hydrophilic side chains, which binder is soluble in the aqueous vehicle but insoluble in water.

9 Claims, No Drawings

6,087,416

AQUEOUS PIGMENTED INK JET INKS FOR PRINTING ON VINYLS

BACKGROUND OF THE INVENTION

This invention relates to aqueous printing inks and, more particularly, to aqueous pigmented ink jet ink compositions suitable for use in direct printing of durable images on an untreated vinyl substrate and to a process of using the ink to create a durable printed image direct to vinyl.

Ink jet ink printing is a form of digital printing in which droplets of ink are made to be ejected (i.e., "fire") from an orifice in a printhead or a spray nozzle in response to an electronic signal from, for example, a computer. Examples of ink jet printing include the thermal ink jet printing, piezoelectric ink jet printing, continuous ink jet printing and air brush printing.

In the past decade, ink jet printing, particularly the thermal and piezo forms, has become extremely popular for home office, small office and personal printer applications, primarily due to its relatively low cost, speed and quite operation. In more recent years, the popularity of ink jet printing has increased even further due to the introduction of systems (printers, software, media and inks) offering very high quality (near photographic) color and graphics capabilities.

Despite the rapid rise in popularity of ink jet printing in the office and home environments, this form of printing has had a more modest rate of acceptance in the large format and very large format applications. In general, the terms "large format" and "very large format" are used to define a class of printers that operate with a particular size media. For example, large format is commonly used to mean printers utilize media of not less than 17 inches in the smallest dimension and very large format is normally used to mean printers that utilize media of not less than about 60 inches in the smallest dimension. Such printers are used for applications such as banners, signage, displays, posters and billboards.

The use of ink jet printing in the large and very large format applications (for convenience, collectively referred to as "large format") has important advantages, not the least of which is the savings in short production runs over more traditional analogue printing methods. Yet, there are also disadvantages. For example, the types of final products produced for these applications may be subject to the elements in outdoor usage (e.g. billboards and other signage applications), and thus need to be far more lightfast, waterfast, abrasion resistant than typically required for office or home printing applications. Most ink jet inks, particularly the aqueous inks that are preferred for well-known environmental reasons, are dye-based and lack the desired waterfastness and lightfastness. Pigmented ink jet inks are generally more lightfast and waterfast than their dye-based counterparts. However, aqueous inks in general don't print well (or at all) on the vinyl and other hydrophobic, durable substrates that are commonly used in large format printing applications. Thus, it is often required that the substrates be pre-treated to accept the ink and/or post-treated to render the image sufficiently waterfast, lightfast and/or durable for the intended use, which adds considerably to the cost.

Accordingly, there is a need in the art for aqueous ink jet inks that are capable of producing durable, waterfast, lightfast images directly on vinyl or other hydrophobic substrates without any need for pre- or post-treatment.

SUMMARY OF THE INVENTION

In one aspect, the invention comprises an ink jet ink composition suitable for use in printing directly to vinyl substrates, said ink comprising:

a) an aqueous vehicle containing at least water and a water-miscible solvent selected from the group consisting of glycols and glycol ethers, wherein water constitutes no more than 80% by weight based on the total weight of the vehicle;

b) an insoluble colorant;

c) a polymeric dispersant;

d) a surfactant selected from the group consisting of silicon surfactants and fluorinated surfactants; and e) optionally, a graft copolymer binder having a hydrophobic backbone and non-ionic, hydrophilic side chains, which binder is soluble in the aqueous vehicle but insoluble in water.

In another aspect, the invention comprises a process of making an image directly on a vinyl substrate, the process comprising jetting an ink composition directly onto a vinyl substrate, wherein the ink composition comprises:

a) an aqueous vehicle containing at least water and a water-miscible solvent selected from the group consisting of glycols and glycol ethers, wherein water constitutes no more than 80% by weight based on the total weight of the vehicle;

b) an insoluble colorant;

c) a polymeric dispersant;

d) a surfactant selected from the group consisting of silicon surfactants and fluorinated surfactants; and e) optionally, a graft copolymer binder having a hydrophobic backbone and non-ionic, hydrophilic side chains, which binder is soluble in the aqueous vehicle but insoluble in water.

DETAIL DESCRIPTION OF THE EMBODIMENTS

The invention provides an ink jet ink composition which is particularly suited for use in ink jet printers in general, and large format ink jet printers in particular. The inks comprise an aqueous vehicle, an insoluble colorant, a polymeric dispersant, preferably a structured polymeric dispersant, and a surfactant. In a particularly preferred embodiment, the inks also contain a non-ionic graft copolymer binder which is soluble in the ink vehicle but insoluble in water.

Aqueous Vehicle

The aqueous vehicle is a mixture of water and at least one water miscible glycol or glycol ether. Deionized water is typically used in ink jet inks. Representative water-miscible glycols and glycol ethers are well known to those skilled in the art and include those disclosed in U.S. Pat. No. 5,221,334, the entire disclosure of which is incorporated herein by reference. The aqueous vehicle may also contain other co-solvents, such as pyrrolidones (e.g., N-methyl pyrrolidone, 2-pyrrolidone, etc.) also disclosed in U.S. Pat. No. 5,221,334 and incorporated herein.

The precise composition of the aqueous vehicle will vary somewhat depending upon the type of printer being used, the type and amount of other components of the ink and the particular vinyl or textile substrate. Generally speaking, however, the vehicle comprises no more than 80%, preferably 60–70%, water, a glycol, a glycol ether and pyrrolidone. Particularly preferred vehicle compositions are set forth in the examples. The aqueous vehicle generally comprises 70 to 99.8%, by weight of the total ink composition.

Insoluble Colorants

The colorant is either a dye or a pigment that is insoluble in the aqueous vehicle. By the term "dye" we mean a colorant that becomes soluble at some point during the printing process (e.g., under heat and/or pressure). By "pigment" we mean a colorant that is insoluble (i.e., in particulate or crystalline form) throughout the printing process. Pigments are the preferred colorants for use in the compositions of this invention.

Pigments

Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 microns, preferably 0.005 to 5 microns, and most preferably from 0.01 to 0.3 micron.

The selected pigment may be used in dry or wet (i.e., presscake) form. In presscake form, the pigment is not aggregated to the extent that it is in dry form and therefore do not require as much deaggregation in the process of preparing the inks. Representative commercial dry and presscake pigments that may be used in practicing the invention are disclosed in U.S. Pat. No. 5,085,698, the disclosure of which is incorporated herein by reference.

In the case of organic pigments, the ink may contain up to approximately 30% pigment by weight, but will generally be in the range of approximately 1 to 15%, preferably approximately 1 to 8%, by weight of the total ink composition for most ink jet printing applications. If an inorganic pigment is selected, the ink will tend to contain higher weight percentages of the pigment than with comparable inks employing organic pigment, and may be as high as approximately 50% because inorganic pigments generally have a higher specific gravity than the organic pigments.

Dyes

The color and amount of dye present in the ink composition is largely a function of choice, being primarily dependent upon the desired color of the print achieved with the ink, the purity of the dye and its strength. Low concentrations of dye may not give adequate color vividness whereas high concentrations may result in poor printhead performance or unacceptably dark colors. Generally, the dye will be present in the amount of 0.01 to 20%, preferably 0.05 to 8%, and most preferably 1 to 5%, by weight, based on the total weight of the ink composition.

Dispersant

Polymeric dispersants suitable for practicing the invention include random polymers and structured polymeric dispersants such as block copolymers and branched-type polymers. The polymers may be anionic, cationic, or nonionic in nature. Random polymers are not as effective in stabilizing colorant dispersions as structured polymers and, therefore, are not preferred. However, a random polymer which has both hydrophilic sections for aqueous solubility and hydrophobic sections for interaction with the colorant and an average molecular weight to contribute to the dispersion stability can be effectively used to practice the present invention. Such polymeric dispersants are disclosed in U.S. Pat. No. 4,597,794.

The block polymers suitable for practicing the invention are AB, BAB and ABC type structures. A block polymer which has hydrophobic and hydrophilic blocks and balanced block sizes to contribute to the dispersion stability may be advantageously used to practice this invention. Functional groups can be built into the hydrophobic (colorant binding) block for stronger specific interactions between the colorant and the polymer dispersant to give an improved dispersion stability. These polymers are known in the art.

The amount of the polymer depends on the structure, molecular weight and other properties of the polymer, and on the other components of the ink composition. The dispersant polymers that are selected in practicing the invention have number average molecular weight of below 40,000, preferably below 20,000, and typically in the range of 2,000 to 10,000.

The polymeric dispersant may be present in the amount of 0.1 to 25%, preferably 0.1 to 8% by weight, based on the total weight of the ink composition. If the amount is too high, it will be difficult to maintain the desired ink viscosity. Dispersion stability will be adversely affected if insufficient polymer is present.

Surfactant

The inks of the invention further contain a silicon surfactant or a fluorinated surfactant. In general, the fluorinated surfactants tend to generate foam in the ink and therefore are not preferred.

Suitable silicon surfactants for use in the present inks include:

(1) a polyether modified siloxane of the formula:

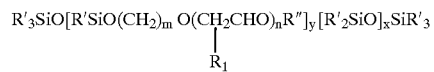

wherein R'=methyl, R"=hydrocarbon chain, and $R_1$=H for ethylene oxide, $CH_3$ for propylene oxide.

Polyether modification of polysiloxanes can be done by modification of the silicone backbone structure through the introduction of side chains. Through the introduction of various types and number of side chains, compatibility can be improved or modified. The relationship or proportion of dimethyl groups to polyether modification (x to y, in the structure diagram) allows the control of the degree of compatibility. This has an influence on surface tension. The polyether chain can be ethylene oxide (EO) and/or propylene oxide (PO). PEO is very hydrophilic, whereas PPO is hydrophobic; control of the ratios of PEO to PPO can control the degree of polarity of the entire silicone additive.

(2) a nonionic siloxane polyoxyalkylene copolymer comprising a siloxane polymer and at least one oxyalkylene polymer, wherein the at least one oxyalkylene polymer comprises from 5% to 95% by weight of the entire copolymer. The copolymers have the general formula:

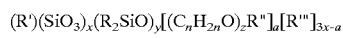

wherein R' is a hydrocarbon radical having a valence of x, R and R" are monovalent hydrocarbon radicals, R''' is a member of the group consisting of alkyl radicals and $R_2Si$-radicals, x is an integer having a value of at least 1, y is an integer having a value of at least 3, n is an integer having a value of 2 to 4, a is an integer having a value of at least one and not greater than 3x, and z is an integer having a value of at least 2.

Generally the siloxane has a weight average molecular weight from about 500 to 10,000, and each of the at least one oxyalkylene polymer(s) has a weight average molecular weight from about 500 to 6,000. Such surfactants are disclosed in U.S. Pat. No. 2,834,748, the disclosure of which are incorporated by reference.

Preferred nonionic siloxane polyoxyalkylene copolymers are a mixture of copolymers wherein each copolymer contains a siloxane polymer and three oxyalkylene polymers in combination and have the general formula:

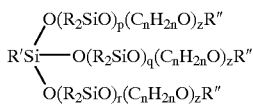

wherein R, R' and R" are monovalent hydrocarbon radicals, p, q, and r are integers each having a value of at least 1, n is an integer having a value of 2 to 4, and z is an integer having a value of at least 2.

Particularly preferred compounds of type (ii) are of the formula:

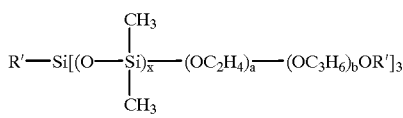

wherein R' is alkyl radicals of 1 to 4 carbon atoms, x is 4 to 60, a+b=1 to x, and a≧b.

(3) block copolymers composed of:

(a) at least one siloxane represented by the formula:

$R_bSiO_{(4-b)}$ wherein R contains from 1 to 22 carbon atoms and is selected from the class consisting of monovalent hydrocarbon groups and divalent hydrocarbon groups, and b=1 to 3; said siloxane block containing at least one of said siloxane units wherein at least one R group is a divalent hydrocarbon group, and (b) at least one oxyalkylene block containing at least two oxyalkylene groups represented by the formula:

—R'O— wherein R' is an alkylene group containing from 2–10 carbon atoms, and wherein the siloxane and oxyalkylene blocks are connected by the divalent hydrocarbon group. Such surfactants are disclosed in U.S. Pat. No. 3,305,504, the disclosure of which are incorporated by reference.

Particularly preferred compounds of type (iii) are of the formula:

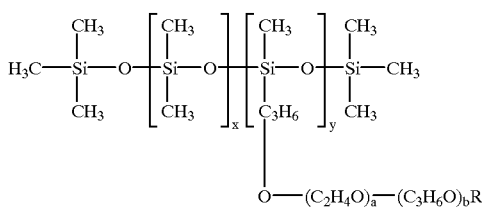

wherein R is hydrogen or alkyl radical of 1 to 4 carbon atoms, a is 1 to 30, b is 0 to 30, x+y=4 to 60 where x≧y and y≧1.

Preferred siloxane surfactants include polyether modified dimethyl siloxane and nonionic silicone glycol copolymers and are available from BYK-Chemie, Wallingford, Conn. as BYK surfactants and from Union Carbide Corp., Danbury, Conn. as Silwet® surfactants.

Fluorinated Surfactant

The fluorinated surfactants useful in the invention have the formula:

$[R(f)Q]_nA$ wherein, R(f) is a perfluoroalkyl group having 6 to 22 carbon atoms; Q is a divalent bridging group; A is a water soluble group; and n is 1 or 2. The bridging Q group may be a diradical of alkyl, aralkyl, alkylaryl, or aryl containing less than 10 carbon atoms, and may contain heteroatoms such as S, O, and N. The linkage between the bridging Q group and the water-soluble A group may be ether, ester, amide, or sulfoamido provided it is stable under the conditions of use. The water-soluble A group may be selected from $-(OCH_2CH_2)_xOH$ wherein x is 1 to 12; —COOM and —$SO_3M$ wherein M is hydrogen, ammonium, amine, or an alkali metal such as lithium, sodium, or potassium; —$PO_4$ $(Z)_y$ wherein y is 1–2 and Z is hydrogen, ammonium, amine, or an alkali metal such as lithium, sodium, or potassium; —$NR_3X$ wherein $R_3$ is an alkyl group of 1 to 4 carbon atoms and X is an anionic counterion selected from the group consisting of halides, acetates, and sulfonates, and other water-soluble zwitterionic groups. Preferably, the water soluble group is an ethylene oxide group no greater than 8 to 9 monomer units, because the larger units are less effective. The balance between the size of the perfluoroalkyl group and the water-soluble group should be such that the surfactant as a whole has a solubility in the desired aqueous carrier medium of at least 0.01% at 25° C., preferably at least 0.05% at 25° C.

Suitable fluorinated surfactants are commercially available from E. I. du Pont de Nemours and Company (Wilmington, Del.) as Zonyl®, and from 3M Company (Minneapolis, Minn.) as Fluorad®, which may be used alone or in combinations. The specific surfactant(s) selected will vary with other components in the ink and the properties of the ink printed adjacent to it. It is important that the ionic character of the selected fluorinated surfactant be compatible with other components in the inks to avoid precipitation or flocculation.

Some examples of suitable fluorinated surfactants are shown in Table 1:

TABLE 1

| FLUORINATED SURFACTANT | R(f) | Q | A | n |
|---|---|---|---|---|
| 1 | $F(CF_2CF_2)_{3-8}$ | $CH_2CH_2SCH_2CH_2$ | $CO_2Li^a$ | 1 |
| 2 | $F(CF_2CF_2)_{3-8}$ | $CH_2CH_2$ | $PO_4(NH_4)_2$ | 1 |
| 3 | $F(CF_2CF_2)_{3-8}$ | $CH_2CH_2$ | $PO_4NH_4$ | 2 |
| 4 | $F(CF_2CF_2)_{3-8}$ | $CH_2CH_2$ | $(OCH_2CH_2)_xOH^b$ | |

$^a$Counter ions other than lithium and ammonium are also useful
$^b$x is 1–10

Preferred fluorinated surfactants include fluoroalkyl alcohol substituted monoether with polyethylene glycol and telomer B monoether with polyethylene glycol.

The amount of surfactant used in the ink will vary with the ink system, efficiency of the surfactant, properties of companion ink(s), and the substrate being printed. Functionally speaking, the surfactant is used to wet the surface of the substrate, so sufficient surfactant should be used to obtain the desired wetting of the substrate surface. As a general observation, the surfactants will be present in an amount of 1 to 6% by weight, preferably 2–4%, based on the total weight of the ink composition.

Non-ionic Graft Copolymer Binder

The inks of this invention can optionally contain a graft copolymer binder with non-ionic hydrophilic side chains with a molecular weight (number average) of at least 500, preferably 1,000–2,000, and a hydrophobic backbone. The side chains comprise 15–60% by weight of the graft copolymer, preferably 20–50%. The copolymers are soluble in the ink vehicle, but insoluble in water.

The non-ionic hydrophilic side chains of the graft copolymer comprise macromonomers which are soluble in water but are insoluble in non-polar organic solvents. The macromonomers are made from non-ionic monomers such as ethyoxytriethylene glycol methacrylate, methoxypolyethylene oxide methacryate, methoxypolyethylene oxide acryate, polyethylenoxide methacrylate, polyethylenoxide acrylate, N-vinyl pyrrolidone and the like.

The backbone of the graft copolymer is hydrophobic and is prepared from monomers such as methyl acrylate, methyl methacrylate, styrene, alpha-methyl styrene, phenyl acrylate, phenyl methacrylate, benzyl acrylate, benzyl methacrylate, 2-phenylethyl acrylate, 2-phenylethyl methacrylate, 2-phenoxyethyl acrylate, 2-phenoxyethyl methacrylate, 1-napthalyl acrylate, 2-naphthalyl acrylate, 2-naphthalyl methacrylate, p-nitrophenyl acrylate, p-nitrophenyl methacrylate, phthalimidomethyl acrylate, phthalimidomethyl methacrylate, N-phenyl acrylamide, N-phenyl methacrylamide, N-benzyl acrylamide, N-(2-phenylethyl) acrylamide, N-(2-phthalimidoethoxymethyl) acrylamide, vinyl benzoate, ethyl acrylate, n-butyl acrylate, 2-ethylhexyl acrylate, ethyl methacrylate, n-butyl methacrylate, t-butyl methacrylate, 2-ethylhexyl methacrylate, cyclohexyl methacrylate, vinyl acetate, vinyl butyrate, and the like.

The hydrophobic backbone may contain up to 30% by weight, based on the total weight of the graft copolymer, of a hydrophilic non-ionic monomer, as listed above.

Other Ingredients

The inks of this invention may contain other additives as are known to those skilled in the art, such as biocides, sequestering agents, humectants, coalescents, viscosity modifiers, defoaming agents, UV absorbers, corrosion inhibitors, and the like.

Ink Properties

Jet velocity, separation length of the droplets, drop size, and stream stability are greatly affected by the surface tension and the viscosity of the ink. Pigmented ink jet inks suitable for use with ink jet printing systems should have a surface tension in the range of about 15 dyne/cm to about 70 dyne/cm and preferably in the range 15 dyne/cm to about 35 dyne/cm. Acceptable viscosities are no greater than about 30 cP at 25° C., and preferably in the range of about 1.0 cP to about 15.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, air brush and valve jet printers. The inks have excellent storage stability for a long period and do not clog in an ink jet apparatus.

EXAMPLES

Dispersant Polymer 1

A 12-liter flask was equipped with a mechanical stirrer, thermometer, N2 inlet, drying tube outlet, and addition funnels. Tetrahydrofuran THF, 3750 gm, and p-xylene, 7.4 gm, were charged to the flask. The catalyst tetrabutyl ammonium m-chlorobenzoate, 3.0 ml of a 1.0 M solution in acetonitrile, was then added. Initiator, 1,1-bis (trimethylsiloxy)-2-methyl propene, 291.1 gm (1.25 M) was injected. Feed I [tetrabutyl ammonium m-chlorobenzoate, 3.0 ml of a 1.0 M solution in acetonitrile] was started and added over 180 minutes. Feed II [trimethylsilyl methacrylate, 1975 gm (12.5 M)] was started at 0.0 minutes and added over 35 minutes. One hundred minutes after Feed II was completed (over 99% of the monomers had reacted) Feed III [benzyl methacrylate, 2860 gm (16.3 M) was started and added over 30 minutes. At 400 minutes, 720 gm of methanol was added to the above solution and distillation begins. During the first stage of distillation, 1764.0 gm of material was removed. Then more methanol 304.0 gm was added and an additional 2255.0 gm of material was distilled out. This made a solution of block copolymer of benzyl methacrylate (13)-b-methacrylic acid (10). It was at 49.7% solids.

Dispersant Polymer 2

A 5-liter flask was equipped with a mechanical stirrer, thermometer, N2 inlet, drying tube outlet, and addition funnels. Tetrahydrofuran THF, 1196 gm was charged to the flask. The catalyst tetrabutyl ammonium m-chlorobenzoate, 0.829 ml of a 1.0 M solution in acetonitrile, was then added. Initiator, 1,1-bis (trimethylsiloxy)-2-methyl propene, 60.0 gm (0.257 M) was injected. Feed I [tetrabutyl ammonium m-chlorobenzoate, 0.829 ml of a 1.0 M solution in acetonitrile] was started and added over 180 minutes. Feed II [trimethylsilyl methacrylate, 531.21 gm (3.36 M) and ethyoxtriethylene glycol methacrylate, 827.07 g, (3.36 M)] was started at 0.0 minutes and added over 35 minutes. One hundred minutes after Feed II was completed (over 99% of the monomers had reacted) Feed III [benzyl methacrylate, 682.76 gm (3.87M) was started and added over 30 minutes. At 400 minutes, 165 gm of methanol was added to the above solution and 2537 gm of material were distilled out. This made a solution of a block copolymer of benzyl methacrylate (15)-b-methacrylic acid (13)-co-ethoxytriethylene glycol methacrylate (13) at 45% solids.

Dispersant Polymer 3

A 5-liter flask was equipped with a mechanical stirrer, thermometer, N2 inlet, drying tube outlet, and addition funnels. Tetrahydrofuran THF, 939.58 gm was charged to the flask. The catalyst tetrabutyl ammonium m-chlorobenzoate, 0.593 ml of a 1.0 M solution in acetonitrile, was then added. Initiator, 1,1-bis (trimethylsiloxy)-2-methyl propene, 60.0 gm (0.257 M) was injected. Feed I [tetrabutyl ammonium m-chlorobenzoate, 0.593 ml of a 1.0 M solution in acetonitrile] was started and added over 180 minutes. Feed II [trimethylsilyl methacrylate, 375.57 gm (2.37 M) and ethyoxtriethylene glycol methacrylate, 437.39 g, (1.78 M)] was started at 0.0 minutes and added over 35 minutes. One hundred minutes after Feed II was completed (over 99% of the monomers had reacted) Feed III [benzyl methacrylate, 542.41 gm (2.20 M) was started and added over 30 minutes. At 400 minutes, 165 gm of methanol and 1706.64 g of 2-pyrrolidone were added to the above solution and 1210.65 gm of material were distilled out. This made a solution of benzyl methacrylate (13)-b-methacrylic acid (10)-b-ethoxytriethylene glycol methacrylate (7.5) at 45% solids.

Binder Polymer 1

A 5-liter flask was equipped with a mechanical stirrer, thermocouple, N2 inlet, and addition funnels. N-methyl pyrrolidone, 864 gm; isopropanol, 216 gm; and a 50% solution of methyoxypolyethyleneglycol methacrylate (Bisomer S20W, International Specialty Chemicals) in water, 108 gm, was added to the pot, and were heated to reflux. Feed I [Bisomer S20W, 612 gm], Feed II [methylmethacrylate, 720 gm and styrene, 120 gm], and Feed III [VAZO. 67, 24 gm dissolved in N-methyl pyrrolidone, 216 gm] were started at time 0.0 minutes. Feeds I and II were added over 360 min; Feed III was added over 390 min. After all feeds were complete, the reaction was refluxed and additional 30 minutes. At 420 min. 240 gm of solvent were distilled off, and 272 gm of N-methyl pyrrolidone were added. The final product was a solution of a graft copolymer of methylmethacrylate(60)-co-styrene (10)-g-methoxypolyethyleneglycol methacrylate (30) at 40.6% solids.

Binder Polymer 2

A 5-liter flask was equipped with a mechanical stirrer, thermocouple, N2 inlet, and addition funnels. Propylene glycol propyl ether, 1100 gm, and a 50% solution of methyoxypolyethyleneglycol methacrylate (B isomer S20W, International Specialty Chemicals) in water, 75 gm, were added to the pot and heated to reflux. Feed I [Bisomer S20W, 425 gm], Feed II [methyl methacrylate, 750 gm] and Feed III [VAZO(67, 20 gm dissolved in propylene glycol propyl ether, 180 gm] were started at time 0.0 minutes. Feeds I and II were added over 360 min; Feed III was added over 390 min. After all feeds were complete, the reaction was refluxed and additional 30 minutes. The final product was benzyl methacrylate (75)-g-methoxypolyethyleneglycol methacrylate (25) at 38.9% solids.

Ink Concentrate 1

A black ink concentrate was prepared by mixing the following ingredients together and then processing the mixture in a microfluidizer (Microfluidics Corp.).

| | |
|---|---|
| Dispersant Polymer 3 | 709.22 g |
| carbon black pigment | 450 g |
| dimethylaminoethanol | 28.4 g |
| N-methylpyrrolidone | 450 g |
| Proxel GXL | 7.5 g |
| BYK-019 | 90 g |
| Deionized water | 1264.88 g |

Ink Concentrate 2:

A cyan ink concentrate was prepared as follows:

| | |
|---|---|
| Dispersant Polymer 1 | 402.4 g |
| phthalocyanine pigment | 300 g |
| Diethylene glycol | 45 g |

This mixture was charged to a 2 roll mill and processed for 30 minutes. Then, the 2 roll mill chip is dissolved to make an aqueous pigment concentrate.

| | |
|---|---|
| Pigment dispersion | 852.32 g |
| dimethylaminoethanol | 49.46 g |
| N-Methyl pyrrolidone | 426.4 g |
| Proxel GXL | 7.99 g |
| Deionized water | 1861.34 g |

Ink Concentrate 3

A magenta ink concentrate was prepared as follows:

| | |
|---|---|
| Dispersant Polymer 2 | 569.63 g |
| quinacridone pigment | 330 g |
| tetraethylene glycol | 54 g |

This mixture was then charged to a 2 roll mill and processed for 90 minutes. The 2 roll mill chip is then dissolved to make an aqueous pigment concentrate.

| | |
|---|---|
| Pigment dispersion | 1485.37 g |
| dimethylaminoethanol | 55.64 g |
| Deionized water | 2817.11 g |
| N-methylpyrrolidone | 629.39 g |
| Proxel GXL | 12.5 g |

Ink Concentrate 4

A yellow ink concentrate was prepared as follows:

| | |
|---|---|
| Dispersant Polymer 1 | 315.0 g |
| yellow pigment | 192.5 g |
| diethylene glycol | 70 g |

This mixture was then charged to a 2 roll mill and processed for 90 minutes. The chip was then dissolved to make the following concentrate.

| | |
|---|---|
| Pigment dispersion | 189.75 g |
| Dimethylaminoethanol | 11.41 g |
| N-methyl pyrrolidone | 64.02 g |
| Proxel GXL | 1.5 g |
| BYK-019 | 27 g |
| Deionized water | 306.32 g |

Ink Concentrate 5

A black ink concentrate was prepared by mixing the following ingredients together and then processing the mixture in a microfluidizer.

| | |
|---|---|
| Dispersant Polymer 3 | 148.3 g |
| carbon black pigment | 150 g |
| dimethylaminoethanol | 7 g |
| Dowanol DPnP | 76.7 g |
| Proxel GXL | 6.8 g |
| Deionized water | 611.1 g |

Ink Concentrate 6

A yellow ink concentrate was prepared as follows:

| | |
|---|---|
| Dispersant Polymer 1 | 315 g |
| yellow pigment | 192.5 g |
| diethylene glycol | 70 g |

This mixture was then charged to a 2 roll mill and processed for 90 minutes and the following concentrate was prepared from the chip.

| | |
|---|---|
| Pigment dispersion | 184.3 g |
| Dimethylaminoethanol | 11.39 g |
| Dowanol DPM | 90 g |
| Proxel GXL | 1.5 g |
| Deionized water | 312.9 g |

| | |
|---|---|
| Dimethylaminoethanol | 5.5 g |
| Dowanol DPM | 90 g |
| Deionized water | 356.9 g |
| Proxel GXL | 1.5 g |

The following Samples were prepared from the above ingredients and concentrates.

| Component | Ink Sample No. | | | | | | | | |
|---|---|---|---|---|---|---|---|---|---|
| | 1 | 2 | 3 | 4 | 5 | 6 | 7 | 8 | 9 |
| Conc. 1 | 20 | | | | | | | 13.3 | |
| Conc. 2 | | 20 | | | | | | | |
| Conc. 3 | | | 21.7 | | | | | | 21.7 |
| Conc. 4 | | | | 20 | | | | | |
| Conc. 5 | | | | | 400 | | | | |
| Conc; 6 | | | | | | 600 | | | |
| Conc. 7 | | | | | | | 740 | | |
| DPnP | 10 | | | 10 | | | | 10 | |
| PnP | | 10 | | | | | | | |
| DPM | | | | | 300 | 509.6 | 407.9 | | |
| BYK-019 | | 0.6 | | | 15 | | 7.5 | 0.2 | |
| BYK-024 | 0.6 | 0.6 | | 0.9 | 15 | | 7.5 | 0.6 | |
| BYK-025 | | | | | | 7.5 | | | |
| BYK-345 | | | | | | 60 | 30 | | |
| S-7602 | 2 | 2 | | 2 | 60 | | | 2 | |
| S-7608 | | | 2 | | | | | | |
| FSO-100 | | | | | | | 15 | | 2 |
| Binder 1 | 14.2 | 15.7 | 11.1 | 13.2 | | | | | 11.1 |
| Binder 2 | | | | | 500.8 | 326.9 | 181.6 | | |
| NMP | | | 21.9 | | | | | 8 | 21.9 |
| HEG | 5 | 5 | | 5 | | | | 5 | |
| DEG | 10 | 10 | 7 | 10 | 300 | 210 | 210 | 10 | 7 |
| Water | 38.2 | 36.1 | 36.3 | 38.9 | 1409.2 | 1286 | 1364.5 | 50.9 | 36.3 |

Glossary of Terms:
DPnP Dowanol ® DPnP (Dow Chemical): dipropylene glycol n-propyl ether
PnP Dowanol ® PnP (Dow Chemical): propylene glycol n-propyl ether
DPM Dowanol ® DPM (Dow Chemical): dipropylene glycol methyl ether
S-7602 Silwet ® L7602 (OSI Specialties): polyalkylene oxide modified dimethyl polysiloxane surfactant
S-7608 Silwet ® L7608 (OSI Specialties): polyalkylene oxide modified dimethyl polysiloxane surfactant
FSO-100 Zonyl ® FSO-100 (Dupont): fluorosurfactant
BYK-019 (BYK Chemie): silicone defoamer
BYK-024 (BYK Chemie): silicone defoamer
BYK-025 (BYK Chemie): silicone defoamer
BYK-345 (BYK Chemie): polyether modified dimethylpolysiloxane surfactant
HEG hexylene glycol
DEG diethylene glycol
NMP n-methyl pyrrolidone Ink Concentrate 7

A magenta ink concentrate was prepared as follows:

| | |
|---|---|
| Dispersant Polymer 2 | 569.63 g |
| Quinacridone pigment | 330 g |
| tetraethylene glycol | 54 g |

This mixture was then charged to a 2 roll mill and processed for 90 minutes and the chip used to make the concentrate.

Example #1

Ink Samples 1–4 were printed onto Cooley Coolflex vinyl from a Trident PixelJet 64 printhead. All of the inks had good uniformity on Coolflex vinyl and printed well from the printhead with all nozzles firing. Printed samples were dried at 70° C. All had good resistance to abrasion when rubbed with a wet and a dry paper towel.

Example #2

Ink Sample 8 was printed onto Cooley Coolflex vinyl using from an Epson 800 printer and from a Hewlett-Packard 1 200C printer by refilling the black ink in each printer. The ink printed well from both printers and gave good uniformity on vinyl. The abrasion resistance, however, was poor relative to the inks containing the Binder Polymer.

Example #3

Ink Sample 9 was printed from a Trident PixelJet 64 printhead onto Cooley Coolflex vinyl. The ink had good uniformity and abrasion resistance.

Example #4

Ink Samples 5–7 were printed from a DataProducts printhead. They all primed easily, had good drop formation, and fired reliably from the printhead. All had good resistance to abrasion when sprayed onto Cooley vinyl and dried at 70° C.

What is claimed is:

1. An ink jet ink composition suitable for use in printing directly to hydrophobic substrates, said ink composition comprising:
   a) an aqueous vehicle containing at least water and a water-miscible solvent selected from the group consisting of glycols and glycol ethers, wherein water constitutes no more than 80% by weight based on the total weight of the vehicle;
   b) an insoluble colorant;
   c) a polymeric dispersant; and
   d) a surfactant selected from the group consisting of silicon surfactants and fluorinated surfactants.

2. The ink of claim 1, further comprising a graft copolymer binder having a hydrophobic backbone and non-ionic, hydrophilic side chains, which binder is soluble in the aqueous vehicle but insoluble in water.

3. The ink of claim 2, wherein said graft copolymer backbone is comprised of monomers selected from the group consisting of methyl acrylate, methyl methacrylate, styrene, alpha-methyl styrene, phenyl acrylate, phenyl methacrylate, benzyl acrylate, benzyl methacrylate, 2-phenylethyl acrylate, 2-phenylethyl methacrylate, 2-phenoxyethyl acrylate, 2-phenoxyethyl methacrylate, 1-napthalyl acrylate, 2-naphthalyl acrylate, 2-naphthalyl methacrylate, p-nitrophenyl acrylate, p-nitrophenyl methacrylate, phthalimidomethyl acrylate, phthalimidomethyl methacrylate, N-phenyl acrylamide, N-phenyl methacrylamide, N-benzyl acrylamide, N-(2-phenylethyl) acrylamide, N-(2-phthalimidoethoxymethyl) acrylamide, vinyl benzoate, ethyl acrylate, n-butyl acrylate, 2-ethylhexyl acrylate, ethyl methacrylate, n-butyl methacrylate, t-butyl methacrylate, 2-ethylhexyl methacrylate, cyclohexyl methacrylate, vinyl acetate, and vinyl butyrate.

4. The ink of claim 3, wherein the side chains of the graft copolymer have a number average molecular weight of 1000–2000 and comprise macromonomers which are
   a) soluble in water but are insoluble in non-polar organic solvents; and
   b) made from non-ionic monomers selected from the group consisting of ethyoxytriethylene glycol methacrylate, methoxypolyethylene oxide methacryate, methoxypolyethylene oxide acryate, polyethylenoxide methacrylate, polyethylenoxide acrylate, and N-vinyl pyrrolidone.

5. The ink of claim 1, wherein said aqueous vehicle comprises water, a water miscible glycol, a glycol ether, and a water miscible pyrrolidone and wherein the water comprises 60–70% by weight based on the total weight of the vehicle.

6. The ink of claim 1 wherein said insoluble colorant comprises a pigment.

7. A process of making an image on a hydrophobic substrate, the process comprising jetting an ink composition onto a hydrophobic substrate, wherein the ink composition comprises:
   a) an aqueous vehicle containing at least water and a water-miscible glycol, wherein water constitutes no more than 80% by weight based on the total weight of the vehicle;
   b) an insoluble colorant;
   c) a polymeric dispersant; and
   d) a surfactant selected from the group consisting of silicon surfactants and fluorinated surfactants.

8. The process of claim 7, where said ink, further comprising a graft copolymer binder having a hydrophobic backbone and non-ionic, hydrophilic side chains, which binder is soluble in the aqueous vehicle but insoluble in water.

9. The process of claim 7, further comprising the step of applying an overcoat composition to the substrate subsequent to the printing step, said overcoat composition comprising:
   a) an aqueous vehicle comprising water, a water miscible pyrrolidone, and a glycol ether, wherein water comprises no more than 80% by weight, based on the total weight of the vehicle;
   b) a graft copolymer binder having a hydrophobic backbone and non-ionic, hydrophilic side chains, which binder is soluble in the aqueous vehicle but insoluble in water; and
   c) a surfactant selected from the group consisting of silicon surfactants and fluorinated surfactants.

* * * * *